United States Patent
Anand et al.

(10) Patent No.: US 10,922,206 B2
(45) Date of Patent: Feb. 16, 2021

(54) SYSTEMS AND METHODS FOR DETERMINING PERFORMANCE METRICS OF REMOTE RELATIONAL DATABASES

(71) Applicant: Capital One Services, LLC, McLean, VA (US)

(72) Inventors: Kumar Anand, Plano, TX (US); Naseema Shaik, Plano, TX (US); Amit Pandey, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 50 days.

(21) Appl. No.: 16/409,051

(22) Filed: May 10, 2019

(65) Prior Publication Data

US 2020/0356462 A1  Nov. 12, 2020

(51) Int. Cl.
| | | |
|---|---|---|
| G06F 17/00 | (2019.01) | |
| G06F 11/34 | (2006.01) | |
| G06F 11/30 | (2006.01) | |
| G06F 16/28 | (2019.01) | |
| G06N 20/00 | (2019.01) | |
| G06F 9/54 | (2006.01) | |
| G06F 11/32 | (2006.01) | |

(52) U.S. Cl.
CPC .......... *G06F 11/3495* (2013.01); *G06F 9/547* (2013.01); *G06F 11/3003* (2013.01); *G06F 11/324* (2013.01); *G06F 11/3452* (2013.01); *G06F 16/284* (2019.01); *G06N 20/00* (2019.01)

(58) Field of Classification Search
CPC .............. G06F 11/3495; G06F 11/324; G06F 11/3452; G06F 11/3003; G06F 9/547; G06F 16/284; G06N 20/00
See application file for complete search history.

(56) References Cited

U.S. PATENT DOCUMENTS

| 9,529,875 B2 | 12/2016 | Brown et al. |
| 2004/0230691 A1* | 11/2004 | Wookey ................. G06N 20/00 709/230 |
| 2006/0149695 A1 | 7/2006 | Bossman et al. |
| 2006/0212428 A1 | 9/2006 | Nelson |
| 2010/0198804 A1* | 8/2010 | Yaskin ................ G06F 21/6218 707/706 |

(Continued)

FOREIGN PATENT DOCUMENTS

WO  2012159404 A1  11/2012

*Primary Examiner* — Greta L Robinson
(74) *Attorney, Agent, or Firm* — Kacvinsky Daisak Bluni PLLC

(57) ABSTRACT

Exemplary embodiments provide systems and methods for determining performance metrics or statistics relating to relational databases that are accessed remotely. Such embodiments may automatically discover the presence or identity of such remotely-stored databases using serverless code, query each database for performance information, convert the performance information into performance metrics, and store the performance metrics as time-series data in a time-series database. The performance metrics may be used to generate notifications, provide input to a machine learning process, adjust settings of the relational databases or an associated service, or provide a visualization of the performance of the databases, among other possibilities.

20 Claims, 10 Drawing Sheets

(56) References Cited

U.S. PATENT DOCUMENTS

| | | | |
|---|---|---|---|
| 2011/0029483 A1* | 2/2011 | Held | G06F 16/214 |
| | | | 707/634 |
| 2014/0013321 A1* | 1/2014 | Laoutaris | G06F 9/5072 |
| | | | 718/1 |
| 2017/0148264 A1* | 5/2017 | Pichette | G06Q 30/06 |
| 2017/0214634 A1* | 7/2017 | Li | H04L 67/1008 |
| 2019/0045008 A1* | 2/2019 | Murthy | H04L 67/1097 |

* cited by examiner

Time-Series Collector Logic 106 /
Metric Collection Logic 126

SYSTEMS AND METHODS FOR DETERMINING PERFORMANCE METRICS OF REMOTE RELATIONAL DATABASES

FIELD OF THE INVENTION

The present disclosure relates to relational databases, and in particular the determination of statistics relating to the performance of relational databases.

BACKGROUND

Some cloud computing services provide hosting capacity for databases. One example of such a service is the Amazon Web Services (AWS) Relational Database Service (RDS). Because relational databases can refer to other relational databases to store detailed records, the number of databases used to store a given dataset can grow quickly. This attribute makes cloud facilities, where the databases can be stored on large servers at a remote location, attractive for hosting an organization's relational databases.

In many cases, the owners or maintainers of databases stored in the cloud would like to scrutinize the performance of their databases (e.g., the amount of time required to retrieve an item from the database, the number of open connections to the database, etc.). However, the owners of the databases are typically different entities from the providers of the cloud computing services. The database owners/administrators may have privacy concerns and may thus not wish to authorize the provider of the cloud hosting service to access their databases.

Consequently, cloud hosting services typically provide only a limited amount of data on the performance of a given database. Moreover, this data is generally provided on a database-by-database basis. Accordingly, it may be possible to obtain a small amount of data on the performance of a particular database, but this solution does not scale well if the owner/administrator wishes to obtain information about many thousands of databases.

SUMMARY

According to one aspect, an automatic discovery service may automatically detect or identify relational databases stored on remote network-accessible servers. The relational databases may be hosted and/or operated by a third-party computing service, such as a cloud computing service, on behalf of another entity. When a new relational database is added to the third-party computing service, it may be automatically and programmatically discovered without receiving further input from a user.

The automatic discovery service may be performed at least in part by serverless code, which may be auto-scaling triggered code that runs on the remote servers. Serverless code may be configured to run and/or automatically scale up based on triggering conditions, but does not incur a charge with the cloud storage service when the code is not running. One example of serverless code is the Amazon Web Services (AWS) Lambda.

Performance metrics may be compiled with respect to the discovered relational databases. To this end, an application programming interface (API) call may be sent to a gateway. The gateway may interface with a time series collector to collect time-series performance metrics or statistics relating to the one or more relational databases. The time-series performance metrics or statistics may be stored in a time-series, temporally indexed database.

The performance metrics may be any suitable metric. Examples of performance metrics include a number or rate of queries to the relational databases, a number of connections to the relational databases, a size of the relational databases, a latency of queries to the relational databases, a replication status of the relational databases, an input/output status of the relational databases, or a status of a sequential scan of the relational databases.

Alternatively or in addition to performance metrics, the system may acquire data stored in the database, such as business data. This data may be used to calculate other metrics, such as business metrics. These metrics may also or alternatively be stored in the time-series database.

In response to the API call, the gateway may extract, from the one or more relational databases, performance data relating to a performance of the one or more relational databases. The performance data may optionally be converted into performance metrics, which may be represented as time series data configured to be stored in a time series database accessible to the time series collector. The gateway may respond to the API call with the performance metrics, or the performance data.

The performance metrics may be used for a variety of purposes. For example, a system may determine that a certain performance metric has exceeded a predetermined threshold. In response, the system may generate a notification for a database administrator identifying the performance metric of concern, and optionally suggesting remedial actions. In some embodiments, an artificial intelligence/machine learning (AI/ML) system may perform a machine learning process on the performance metrics, and may use a result of the machine learning process to change a setting of the relational databases or third-party service in order to improve one or more of the performance metrics. In further embodiments, the system may generate and output a visualization of the performance metrics or statistics.

DETAILED DESCRIPTION OF EXAMPLE EMBODIMENTS

Figure 1:
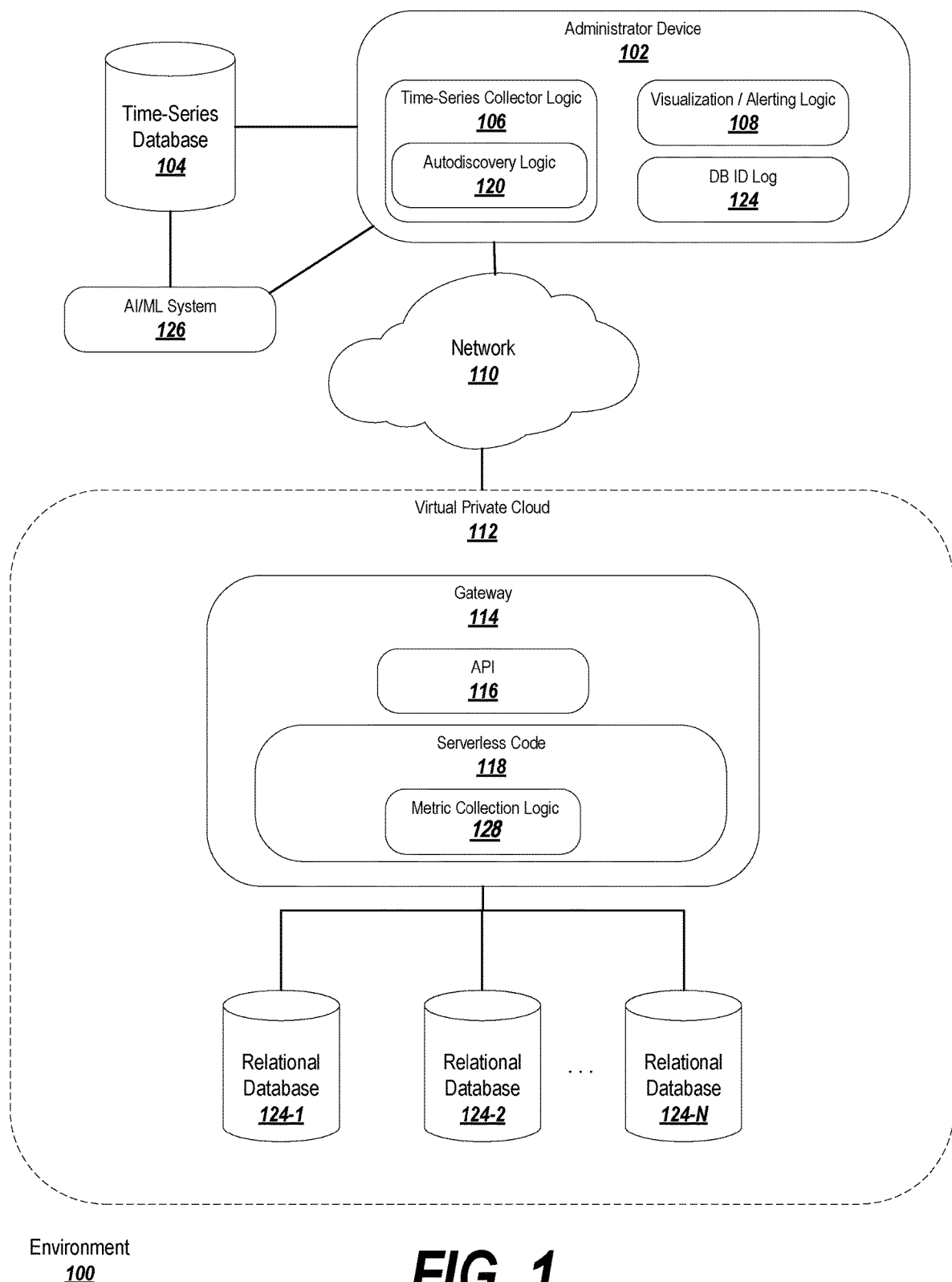
FIG. 1 depicts an exemplary environment 100 suitable for practicing exemplary embodiments of the invention.

Exemplary embodiments provide techniques for retrieving, storing, and using performance data for remotely-hosted relational databases. The relational databases may be hosted by a third-party service that is distinct from an entity that administers the databases.

These techniques may involve performing an auto-discovery process using serverless code, or a similar type of instructions that execute on a trigger and/or do not incur a cost with the service hosting the relational databases. According to one embodiment, the serverless code may reside on, or be accessible to, a gateway of the service, and may run at regular intervals (e.g., once per minute) to detect the addition or subtraction of a database to the service.

The relational databases may be associated with performance information; for instance, queries or accesses to the databases may be logged. This performance information may be collected by a time-series collector and optionally transformed into performance metrics. For example, time stamps associated with the queries may be used to determine a rate at which queries to the database(s) are being made/processed. Similarly, the system may compare the time between when a query is made and when a reply is sent in order to determine a latency associated with the query. Accordingly the performance information may be used to determine performance data, which may be associated with relevant times keyed to the performance data (e.g., the end time or time period over which the above-mentioned rate or latency was applicable). Based on these times, the performance metrics may be stored in a time-series database.

After the performance metrics are collected and stored, it may be used for several purposes. In one embodiment, the metrics may be processed so that visualizations may be created; the visualizations may be displayed or stored. In further embodiments, the metrics may be analyzed to determine if they give rise to conditions that trigger further action, such as generating a notification for an administrator. In still further embodiments, machine learning may be applied to the time series data in order to identify trends or trigger actions in the data, or to recommend changes to the settings of the relational databases or the third-party hosting service in order to improve a performance of the database/service.

The following description of embodiments provides non-limiting representative examples referencing numerals to particularly describe features and teachings of different aspects of the invention. The embodiments described should be recognized as capable of implementation separately, or in combination with other embodiments from the description of the embodiments. The description of embodiments should facilitate understanding of the invention to such an extent that other implementations, not specifically covered but within the knowledge of a person of skill in the art having read the description of embodiments, would be understood to be consistent with an application of the invention.

FIG. 1 depicts an exemplary environment 100 suitable for practicing exemplary embodiments of the invention. In the environment 100, an administrator device 102 (a computing device such as a personal computer, server, workstation, tablet, mobile device, etc.) is responsible for maintaining data in a relational database (in some embodiments, the administrator device 102 is the owner of the data in the relational database, or is authorized to view or interact with the data).

The administrator device 102 may interact with a virtual private cloud 112 on which the relational database is stored. The virtual private cloud 112 may represent a pool of resources available to the administrator device 102 and provided by the third-party service. An example of a virtual private cloud 112 is that provided by Amazon Web Services (AWS).

The relational database may be divided between multiple different databases 124-1, 124-2, . . . 124-N in the virtual private cloud 112. The number of individual relational databases 124-N at any given time may depend on the size of the overall relational database, and so new databases may be added (or old databases may be removed) over time. An example of a service capable of providing relational databases in this manner is the AWS Relational Database Service (RDS).

In order to identify new or removed databases, the administrator device 102 may support autodiscovery logic 120. The autodiscovery logic may be configured to query the virtual private cloud (potentially via an application programming interface, or "API," 116) at regular intervals (e.g., once per minute, or at other timings as appropriate to the application and the expected rate at which databases may be created or removed) in order to identify any new or removed databases in the virtual private cloud 112. The databases may include databases that were created or removed manually by a user, or databases that have been automatically created or removed in order to account for new or deleted data, new data fields, data localization, etc.

The existence of a new database may be discovered, for example, using a script that scans for active instances of databases on the database hosting service. Typically, this will return an identifier for each discovered database, which may be stored in a database identifier log 124 on the administrator device. When querying for new databases, the autodiscovery logic may consult the database identifier log 124 to determine whether a discovered database is already known, and may refrain from adding duplicate entries. Furthermore, the autodiscovery logic may be configurable to scan only for currently unknown databases (e.g., only returning those that do not match a database already stored in the log 124). In a similar manner, the autodiscovery logic 120 may scan the virtual private cloud 112 for a list of all databases associated with the administrator device, and may note which databases are reflected in the log 124, but were not found during the scan; this may indicate that the database was removed.

Figure 2:
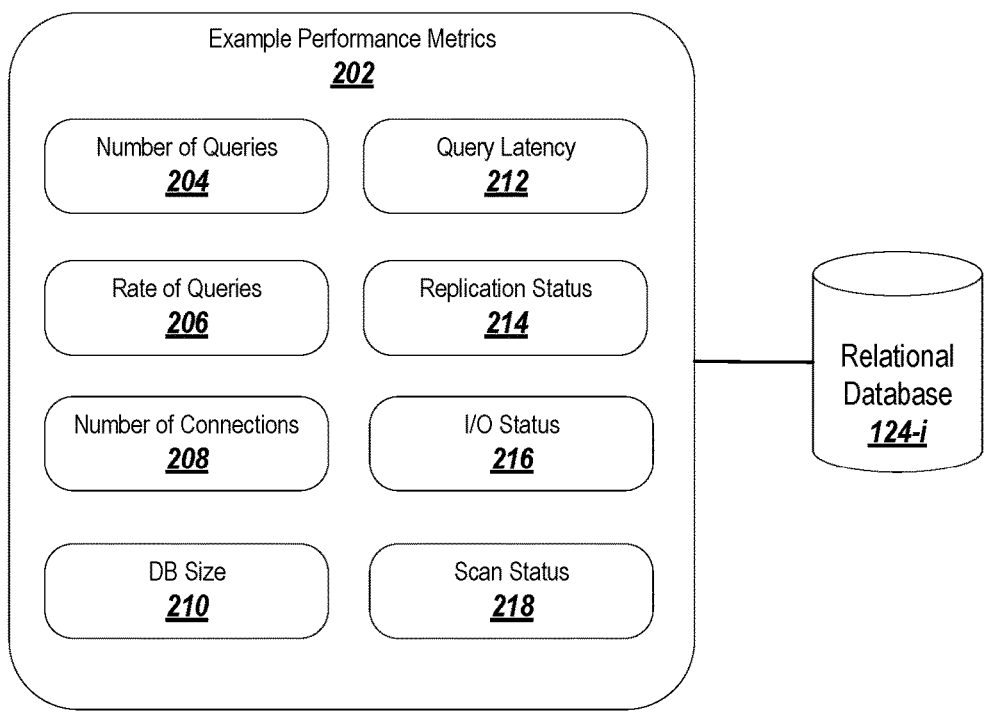
FIG. 2 depicts a sample of performance metrics that may be computed in exemplary embodiments.

Once the current list of databases has been discovered, time-series collector logic 106 may be used to collect performance data or metrics pertaining to the databases. Various performance metrics may be associated with each of the relational databases 124-i, as shown for example in FIG. 2. In this example, the performance metrics may be stored directly in the relational databases, which logs raw information relating to database queries and accesses (e.g., the time and date at which a connection was established, what was searched for in a query and when, the originator of the query, etc). In some cases, these raw metrics can be used directly in the time-series database, although in others they may need to be transformed in order to be useful (thus, the result of a transformation of the metrics into useful data or statistics may be a conversion of the raw metrics or information into a different form or value, or may be an identity transformation that returns the input metric or information).

The metrics that may be derived from the information in the databases may include, for example, a number of queries 204 in a given period of time (or since the last time the performance metrics were checked, or since the beginning of tracking of the performance metrics), the rate of queries 206 over a period of time, the number of connections 208 in existence at a given time or over a given period of time, the size of the database 210 at a given time, the latency 212 in responding to queries, the replication status 214 of the database, the input/output status 216 of the database, or the scan status 218 of the database. The raw information in the databases may be transformed into the metrics by, for example, examining the individual entries in the databases and determining how many entries occurred over a relevant period of time (e.g., every hour, every minute, since the last query, etc.).

As previously noted, the performance data or metrics may be stored in a time-series database 104, which may be a database indexed by a time value or in which the data is stored chronologically. The time series database 104 may be stored locally at the administrator device 102, or may be stored remotely from the administrator device 102 and accessible through a network, such as the Internet. The administrator device 102 may interact with the time-series database 104 via time-series collector logic 106.

Figure 3:
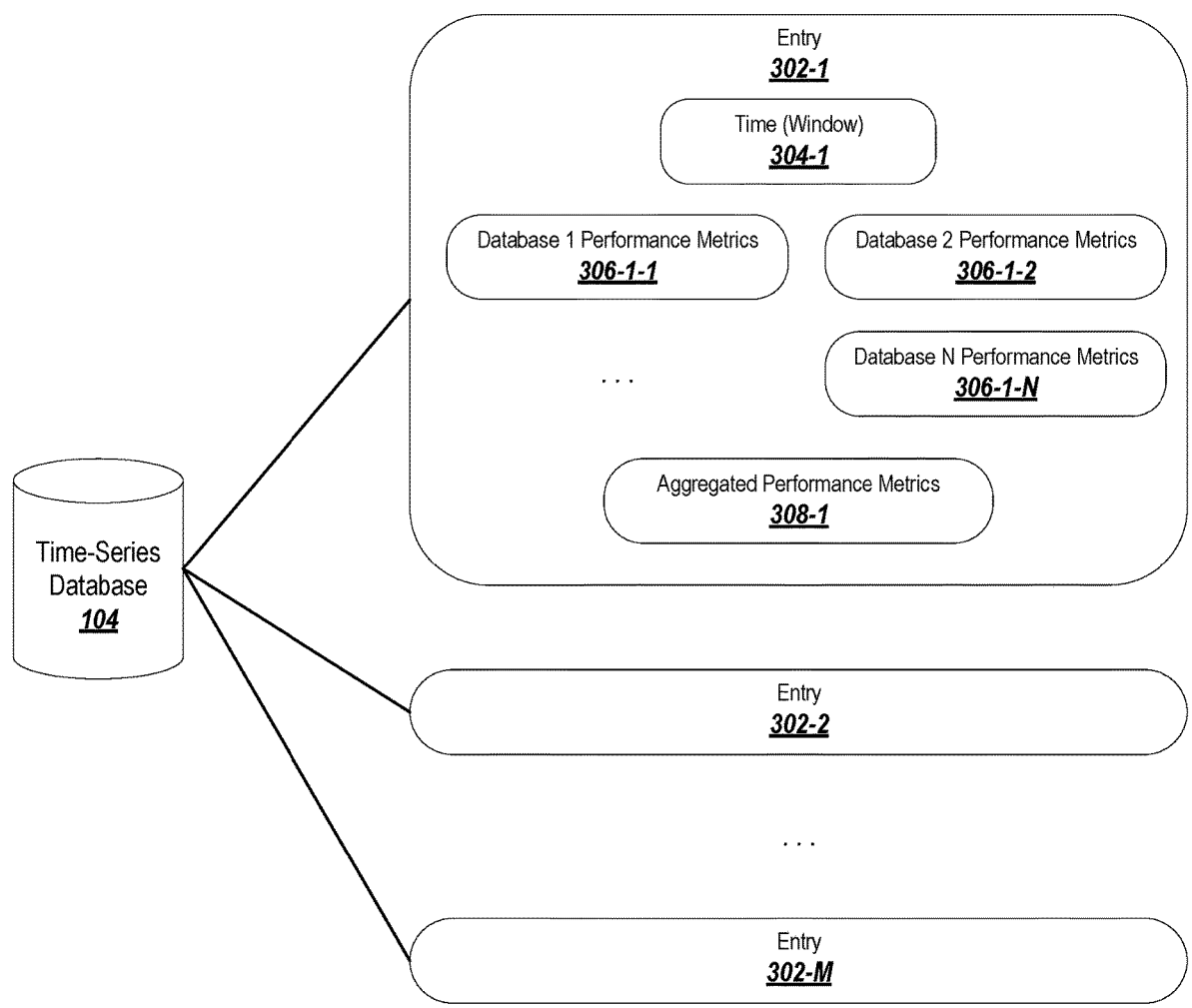
FIG. 3 depicts an example of a time-series database suitable for use with exemplary embodiments.

An example of a time-series database 104 is shown in FIG. 3. The time series database includes a number of entries 302-1, 302-2, . . . 302-M that are organized chronologically or otherwise associated with a key value 304-$i$ representing a time or time period to which the entry pertains. The entry 302-$i$ may include performance metrics 306-$i$-$j$, where i is an integer in {1, . . . , M} referring to a particular entry (and therefore the associated time or time period relevant to the entry), and j is an integer in {1, . . . , N} representing a particular database from which the metrics were collected. Optionally, each entry 302-$i$ may be associated with aggregated performance metrics 308-$i$, which represent an aggregation or average (as is suitable to the particular performance metric) for each of the performance metrics 306-$i$-$j$ associated with entry 302-$i$.

Returning to FIG. 1, in order to collect the time-series data or performance metrics, the time-series collector logic 106 may interface with serverless code 118 (or other code having similar properties) running on a gateway 114 of the virtual private cloud 112.

The serverless code 118 may be configured to run only when certain conditions are met (such as certain triggering conditions, or when triggered by an outside request). When not running, the serverless code 118 may be stopped, disabled, or otherwise in a hibernated state and may not incur charges with the proprietor of the virtual private cloud 112. Among other elements, the serverless code 118 may include metric collection logic 128 that, when triggered (e.g., at predetermined intervals, or when triggered by the time-series collector logic 106), may examine the relational databases 124-$i$, and may either pass the raw information to the time-series collector logic 106 (to be transformed and/or stored in the time-series database 104), or may transform the raw information into metrics or statistics and pass the transformed information to the time-series collector logic 106.

It is noted that, although the exemplary embodiments described above and below relate to collecting performance information about the databases, the same techniques can be applied to aggregate and/or organize information (such as business information) based on entries in the databases. For instance, if the databases store data pertaining to banking transactions (e.g., loans made, account withdrawals, etc.), then the same techniques could be applied to collect time-series information relating to the transactions (e.g., a rate of loans being made over the course of a month, an average size of the loans, latency between loan request and loan approval, number of withdrawals in a day across all accounts, etc.).

When the performance metrics are collected in the time-series database 104, they can be displayed using visualization and alerting logic 108. This logic 108 may include instructions for plotting a range of performance metrics from the time-series database 104 on a graph or chart, displaying raw performance data or metrics, rendering the performance metrics as a heat-map or similar image, or creating a custom data visualization.

The logic 108 may also or alternatively include instructions for generating alerts or notifications with respect to the performance data or metrics. The alerts or notifications may be represented as a set of rules including triggering conditions and an action to be taken. The triggering conditions may include, for example, the identity of one or more performance data or metrics, and a threshold value that, if crossed, will cause the alerts/notifications to take a specified action (which may also be included in the rules). The rules may be Boolean rules so that multiple triggering conditions must occur in a particular combination in order to trigger the associated action. The actions may include generating a notification message for an administrator of the relational database, which may include an identification of the condition that caused the action to be taken. For example, if the latency of queries to the relational database exceed a predetermined threshold, the system may generate an alert informing the administrator of unacceptable latency. The administrator may then take suitable action. In some cases, instead of generating an alert or notification, the system may take an automated action in an attempt to remedy the situation (e.g., requesting increased resources from the virtual private cloud 112).

Separately or in connection with the visualization and alerting logic 108, the system may automatically apply or recommend modifications to the virtual private cloud 112 and/or the relational databases 124-$i$ in order to improve the performance of the relational databases 124-$i$. To this end, the system may employ an Artificial Intelligence/Machine Learning system 126 to learn associations between network, cloud, or database settings and performance metrics. The AI/ML system 126 may be provided at the administrator device 102 or remotely from the administrator device 102 and may interface with the time-series database 104.

Figure 4:
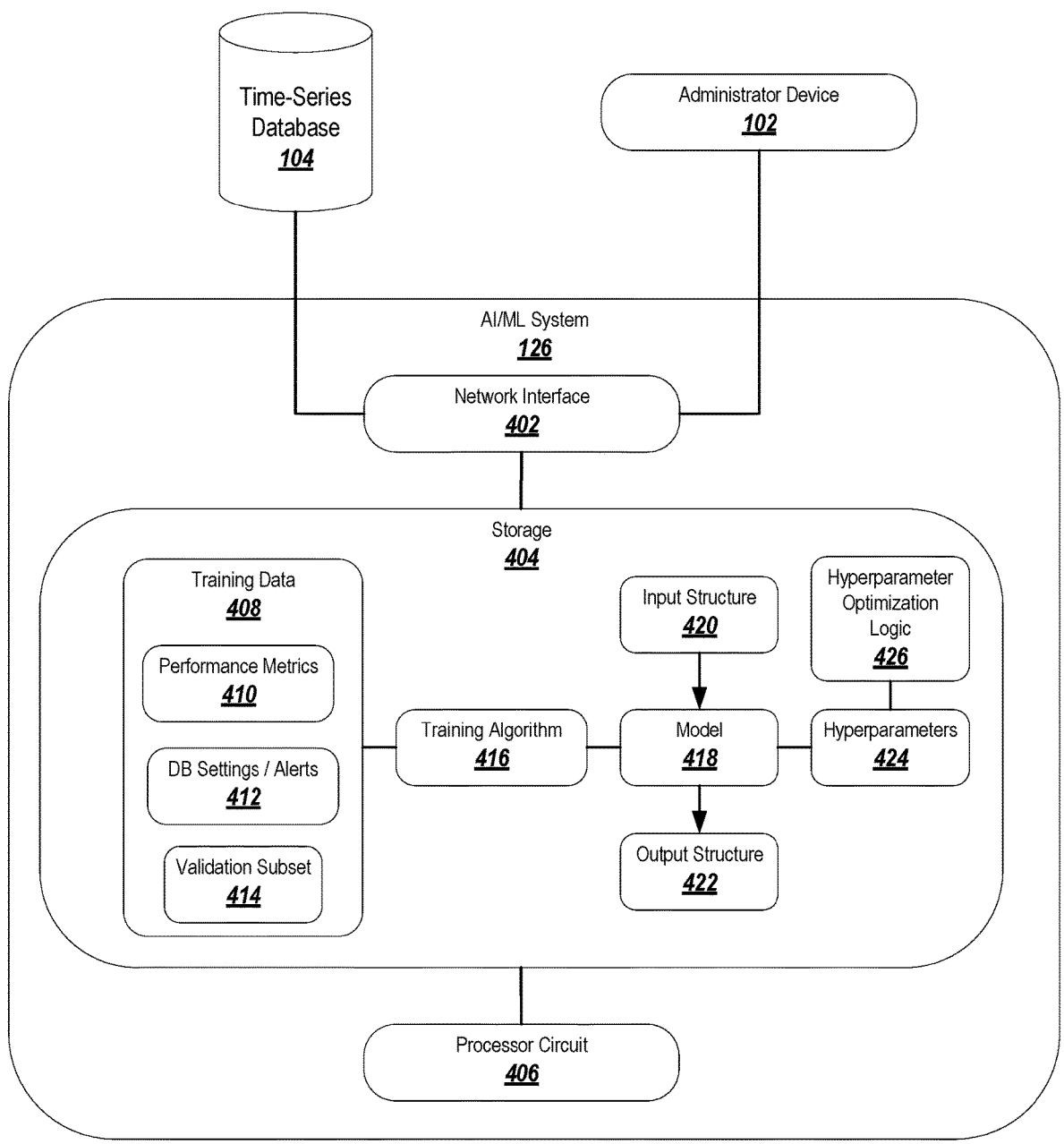
FIG. 4 depicts an exemplary artificial intelligence/machine learning system suitable for use with exemplary embodiments.

FIG. 4 depicts an exemplary artificial intelligence/machine learning system 126 suitable for use with exemplary embodiments. The AI/ML system 126 may be implemented on a dedicated AI/ML computing device, a separate device, the device storing the time-series database 104, the administrator device 102, or anywhere else as appropriate.

The AI/ML system may include a network interface 402 for receiving data and transmitting suggested settings changes. For example, the network interface 402 may connect to the time-series database for retrieving training data and/or input data suitable for making predictions. The network interface 402 may further connect to the administrator device for transmitting suggested network changes.

The AI/ML system 126 may further include a storage device 404, which may include a hard drive, solid state storage, and/or random access memory. The storage may hold training data 408, which may include performance metrics 410 from the time-series database, and database settings 412 that were in effect at the time the performance metrics were collected (this information may optionally be collected as part of the process of collecting the performance metrics). Past data 410, 412 may be stored as training data and, once a suitable AI/ML model 418 is trained, current data may be retrieved from the time-series database 104 to be used for predictions.

It is contemplated that the performance information from the time-series database 104 may be sufficient to train the model 418; however, if needed additional data from a similar context (preferably from databases from the same cloud service provider) may be used to supplement the time-series data from the database 104.

In some cases, the input/output data pair may include: a change in a database setting that occurred at a time $t_1$; the database setting that was previously in effect at a previous time $t_0$; the database performance characteristics at the time $t_1$; and a change in the performance characteristics at some time $t_2$ a sufficient time after $t_1$ so that any change in the performance characteristics attributable to the change in database settings can be discerned. The system 126 may thus learn an association between the change in database settings and how the performance characteristics evolve.

In a similar manner, the data may include alerts that were raised in response to the performance characteristics, as well as settings and/or performance characteristics that were in existence at some time before the alert was raised, so that the system may learn to predict problematic conditions before they arise.

In some embodiments, some of the training data 408 may be used to initially train the model 418, and some may be held back as a validation subset 414. The portion of the training data 408 not including the validation subset 414 may be used to train the model 418, whereas the validation subset 418 may be held back and used to test the trained model 418 to verify that the model 418 is able to generalize its predictions to new data.

The training data 408 may be applied to train a model 418. Depending on the particular application, different types of models 418 may be suitable for use. For instance, in the depicted example, an artificial neural network (ANN) may be particularly well-suited to learning associations between performance metrics 410 and the database settings 412 that gave rise to the performance metrics 410. Similarity and metric distance learning may also be well-suited to this particular type of task, although one of ordinary skill in the art will recognize that different types of models 418 may be used, depending on the developer's goals, the resources available, the amount of input data available, etc.

Any suitable training algorithm 416 may be used to train the model 418. Nonetheless, the example depicted in FIG. 4 may be particularly well-suited to a supervised training algorithm or reinforcement learning. For a supervised training algorithm, the system 126 may apply the database settings 412 as input data, to which resulting performance metrics 410 may be mapped to learn associations between the settings and alerts 412 and the performance metrics 410 that result. In this case, the performance metrics 410 may be used as labels for the database settings. In a reinforcement learning scenario, the database settings 412 may be adjusted by the model 418 in real-time, and the resulting performance metrics 410 may be measured. The system may attempt to maximize some or all (or a weighted combination) of the performance metrics 410.

The training algorithm 416 may be applied using a processor circuit 406, which may include suitable hardware processing resources that operate on the logic and structures in the storage 404. The training algorithm 416 and/or the development of the trained model 418 may be at least partially dependent on model hyperparameters 424; in exemplary embodiments, the model hyperparameters may be automatically selected based on hyperparameter optimization logic 426, which may include any known hyperparameter optimization techniques as appropriate to the model 418 selected and the training algorithm 416 to be used.

Optionally, the model 418 may be re-trained over time, in order to accommodate changing database conditions or contexts.

Once the model 418 is trained, it may be applied (by the processor circuit 406) to new input data. The new input data may include current performance metrics and/or database (or network, or system) settings as retrieved from the time-series database 104 and/or the administrator device 102. This input to the model 418 may be formatted according to a predefined input structure 420 mirroring the way that the training data 408 was provided to the model 418. The model 418 may generate an output data structure 422 which may be, for example, a prediction of future performance characteristics given the current state of the database(s)s, and/or recommended settings for the database(s), network, or cloud service provider that are predicted to improve the performance of the database(s).

The output data structure 422 may be provided to the administrator device 102 to be operated upon. For instance, if the output data structure 422 includes a predicted future performance of the database(s), the output data structure 422 may be visualized according to the administrator device's visualization logic and presented to an administrator. In another embodiment, the predicted future performance characteristics may be compared to the device 102's alerting rules and suitable alerts or notifications may be generated. On the other hand, if the output data structure 422 includes recommended changes to network settings, then these changes may be presented in a user interface so that an administrator can review and sign off on the changes. In another embodiment, the changes may be automatically applied by generating a change instruction at the administrator device 102. In either case, the changes may be sent to the gateway and applied at the cloud service.

Figure 5A:
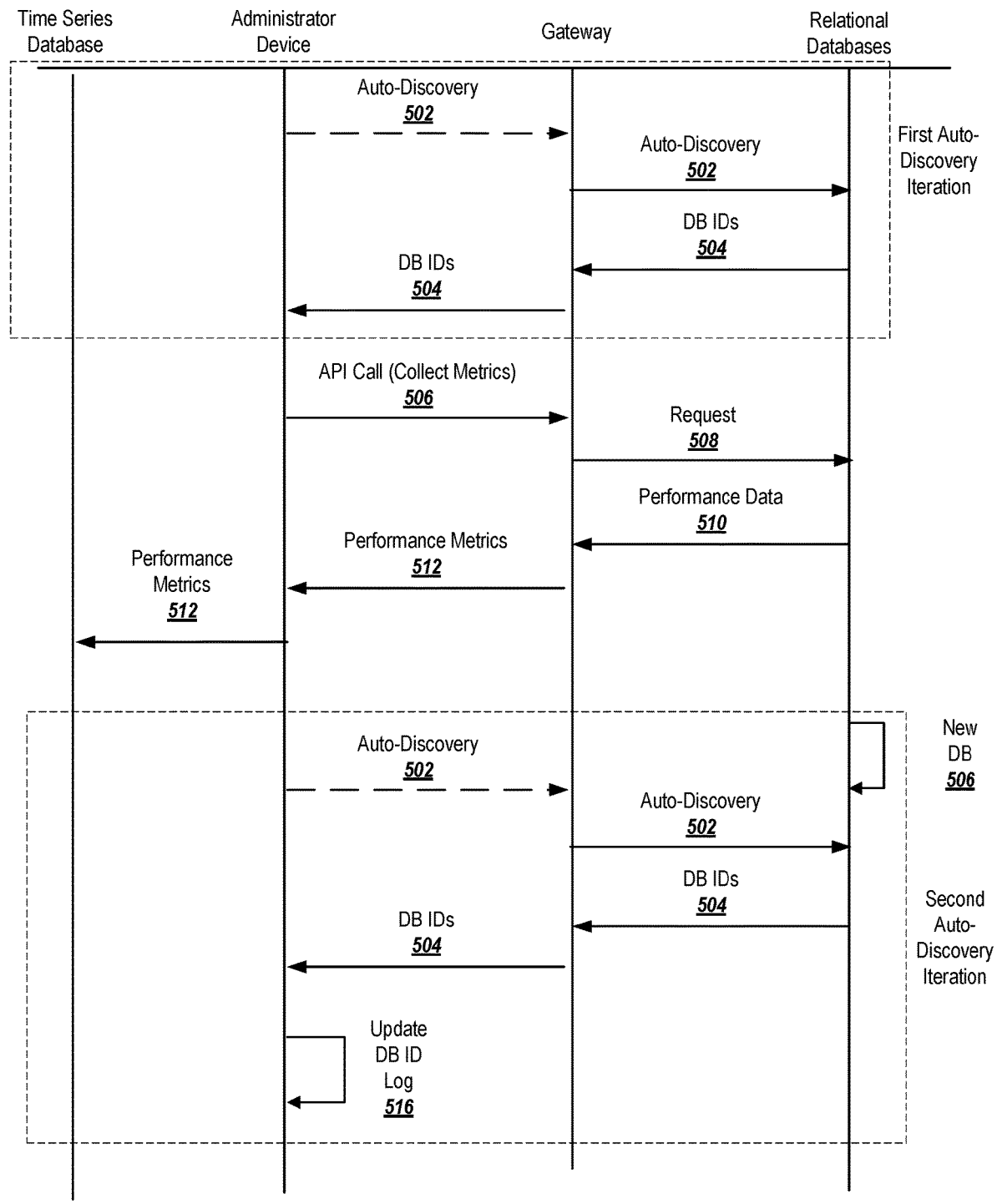
FIGS. 5A-5B represent a data flow diagram depicting an exemplary flow of information in the environment 100 according to an exemplary embodiment.
Figure 5B:
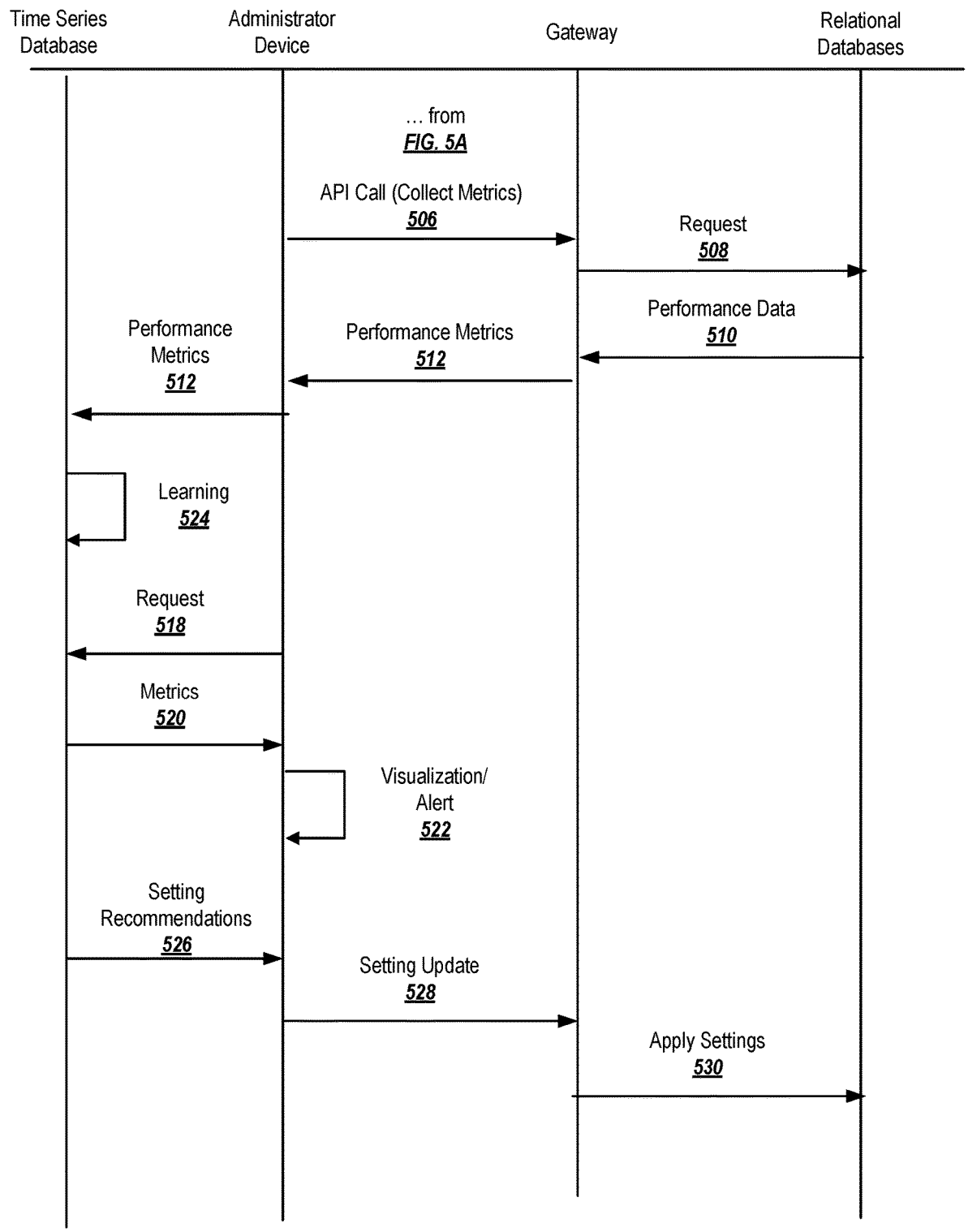
Figure 6A:
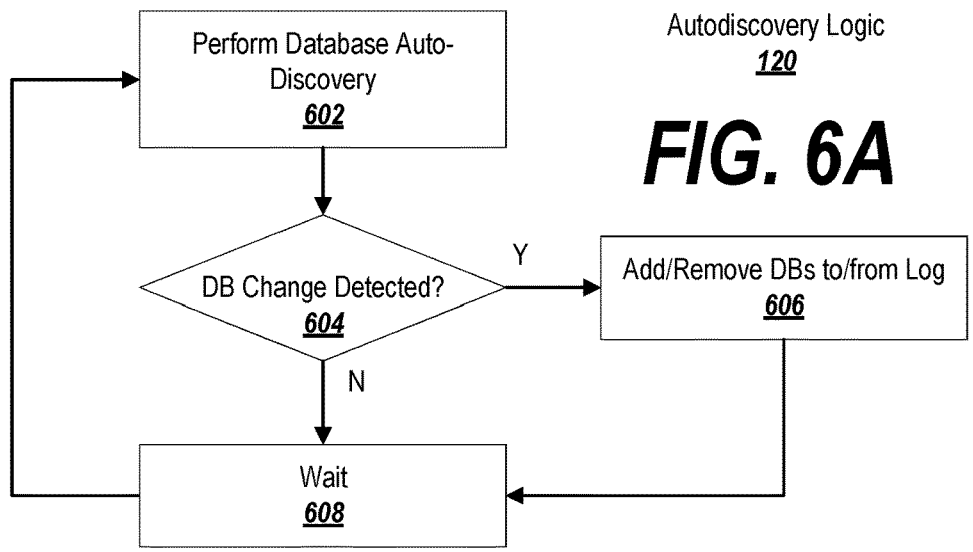
FIGS. 6A-6C are flowcharts depicting exemplary processes suitable for practicing exemplary embodiments of the invention.
Figure 6B:
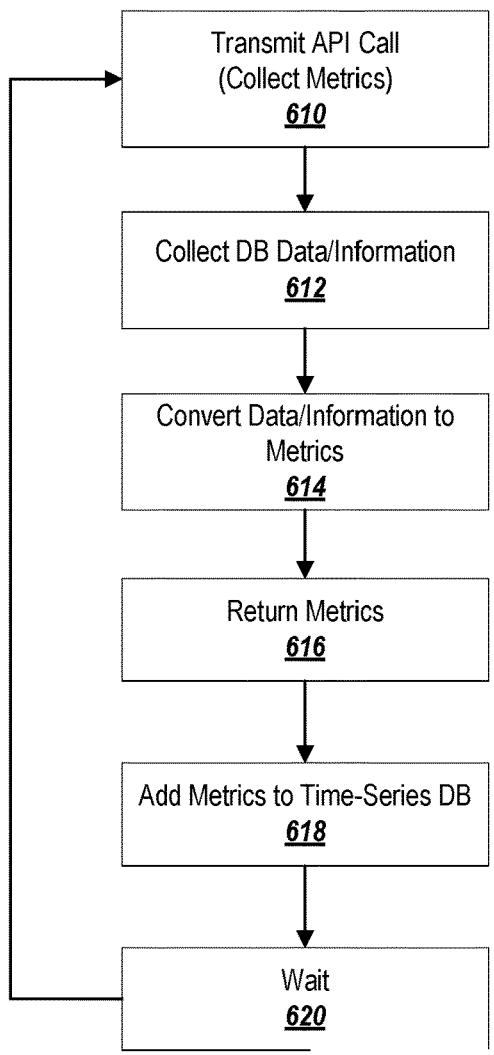
Figure 6C:
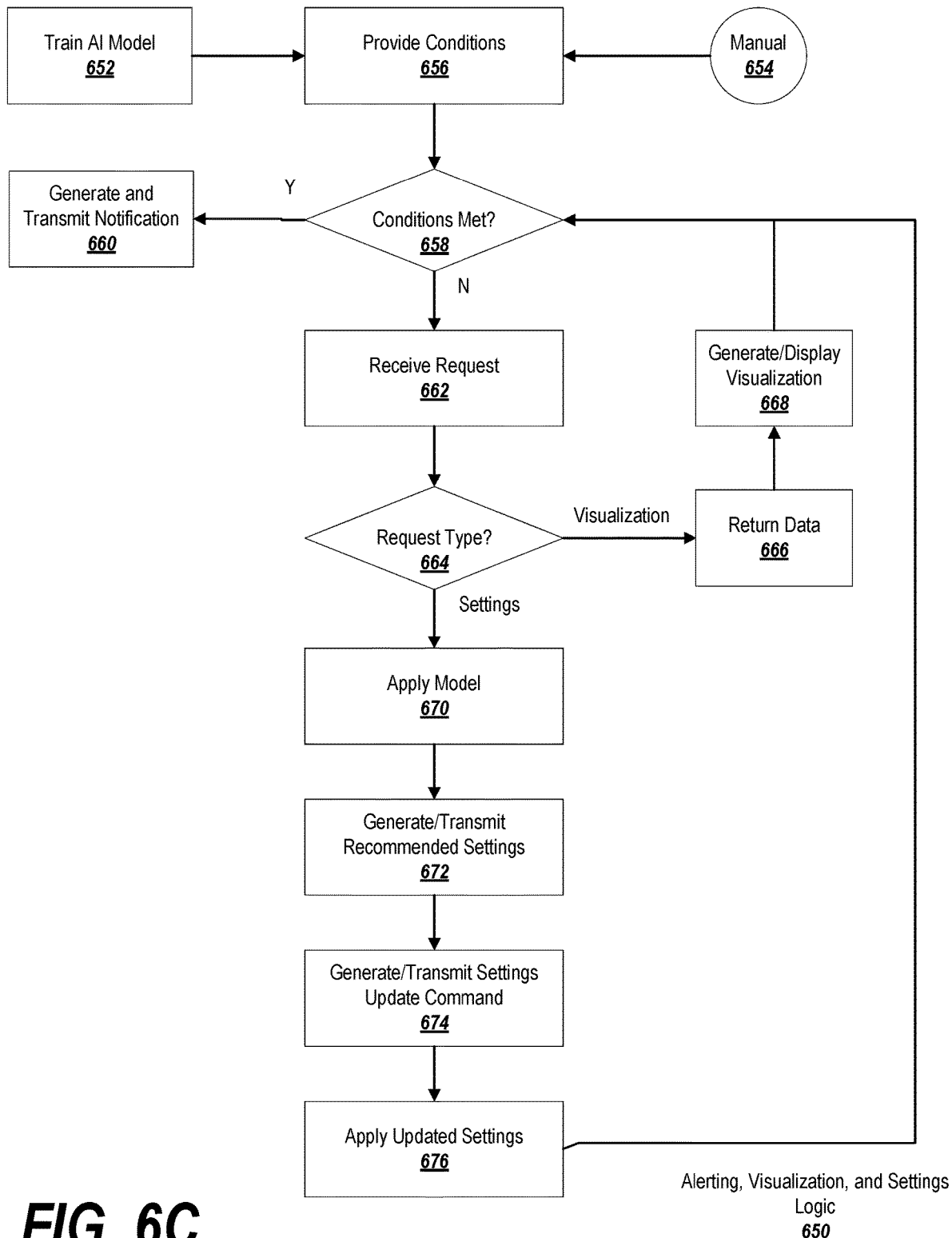

FIGS. 5A-5B represent a data flow diagram depicting an exemplary flow of information in the environment 100 according to an exemplary embodiment. FIGS. 6A-6C are flowcharts depicting exemplary processes suitable for practicing exemplary embodiments of the invention. These sets of Figures will be cross-referenced below in order to better explain the exemplary embodiments depicted.

FIG. 6A depicts a process for performing an autodiscovery process, which may be embodied as autodiscovery logic 120. Initially, at 602 the system performs a database autodiscovery, which may include running scripts or submitting a query to the virtual private cloud. As reflected in FIG. 5A, this may involve (optionally) generating an auto-discovery request 502 at the administrator device, and transmitting the request to the gateway in the virtual private cloud. At this point, gateway may query the virtual private cloud to determine the relational databases associated with the administrator device. In response, the identifiers 504 of any discovered databases may be reported to the gateway, and may be relayed by the gateway back to the administrator device.

Returning to FIG. 6A, at block 604 the administrator device may determine if any changes to the databases has been detected (e.g., new or removed databases). This may be accomplished by checking the database identifier log stored on the administrator device to determine if the list of databases stored on the device matches the list of databases returned by the gateway. If not (see the first auto-discovery iteration in FIG. 5A), then at block 608 the system waits a predetermined period of time (e.g., one minute) and then processing returns to block 602, where the auto-discovery process begins anew.

However, if a database change is detected at block 604 (see the second auto-discovery iteration in FIG. 5A, where a new database has been added at 506), then processing proceeds to block 606 and the database identifier log on the administrator device is updated accordingly (see update at 516 in FIG. 5A). Processing then proceeds to block 608, and the system waits a predetermined period of time before returning to block 602.

FIG. 6B depicts exemplary logic employed by the time-series collector and/or the metric collector as shown in FIG. 1. As described below and shown in FIGS. 5A-5B, some of these steps are performed by the time-series collector logic 106 on the administrator device, while others are performed by metric collection logic 128 on the gateway. In some cases, certain processing logic may be performed either on the administrator device or the gateway, depending on the application.

At block 610, the gateway may optionally call into an API on the gateway, requesting that the gateway execute the serverless code to collect metrics relating to the performance of the database (see message 506 in FIGS. 5A and 5B). In other embodiments, the serverless code may be configured to automatically execute at certain timings or under certain conditions, and accordingly block 610 (and message 506) may be omitted.

At block 612, the gateway may collect data, information, etc. from the relational databases. This may involve querying the logs of each database for the information (see messages 508 and 510 in FIGS. 5A and 5B).

Some of the information may be stored in the time-series database as-is, and hence may be immediately returned to the time-series database. In some cases, however, the data must be transformed in order to make it useful (e.g., by calculating a rate). Accordingly, at block 614, the data/information may be converted into metrics/statistics (which may include the raw data and/or the transformed data). Block 614 may be performed by the serverless code on the gateway or the administrator device, as appropriate. In the example depicted in FIGS. 5A-5B, the metrics/statistics are determined on the gateway before being forwarded to the administrator device in message 512. At block 616, the metrics/statistics may be returned to the administrator device (they may be returned from the gateway if they were calculated there, or from logic executing on the administrator device if the administrator device handles the calculations).

Regardless of where the metrics/statistics are calculated, they may be transmitted (or written) from the administrator device to the time-series database for storage at block 618. At block 620, the system may wait (a predetermined period of time, or until predefined conditions occur), and then processing may return to block 610 and the system may begin collecting the next round of data from the databases.

Once collected, the metrics/statistics may be used in a number of ways, as shown in FIG. 6C. In order to make use of certain recommendation capabilities, an AI model may be trained at block 652 (as previously described in connection with FIG. 4, and as shown at 524 in FIG. 5B). Moreover, the logic 650 may require, as an input, the conditions that may trigger alerts or notifications to be issued (provided at block 610). Typically, these alerts would be triggered for problematic situations, such as high latency (although this is not required). One option is to provide these conditions manually at block 654, in which case an administrator may select values for network performance parameters where a trigger is desirable.

In another embodiment, the AI model trained at block 652 may be capable of predicting future performance characteristics and/or likely problematic conditions that may trigger alerts based off of current performance characteristics and/or database settings. Accordingly, at block 656, the trained AI model may be used to suggest conditions that are likely to, in the future, result in problematic performance characteristics.

At block 658, the system may inspect the current performance characteristics of the database(s) and/or the database settings (as retrieved at 512 in FIGS. 5A-5B), and may determine whether any of the conditions specified in block 656 are currently met. If so, then processing may proceed to block 660, and the system may generate a suitable notification of the conditions and transmit/display it to be viewed and/or acted upon by an administrator.

If not, then processing may proceed to block 662, where the system may receive a request (e.g., from an administrator, or programmatically from the administrator device). In one embodiment, the request may be a request for a data visualization or a request for a settings recommendation. Accordingly, at block 664, the system determines what type of request is received.

If the request is a request for a data visualization, then at block 666 the system may return the data to be visualized. This may be accomplished, for example, by requesting the appropriate data (e.g., by specifying a time of interest for the data) from the time-series database (518-520 in FIG. 5B). Based on this data, the system may generate, display, and/or store a data visualization such as a graph, chart, scatterplot, etc., illustrating the data over the time period of interest (522 in FIG. 5B). Processing may then return to block 658, where the system determines if the conditions have evolved so as to warrant an alert or notification before awaiting the next command.

If the request at block 662 is for a settings recommendation, then at block 670 the system may apply the model trained at block 652 to the current database settings and/or performance characteristics, and may use the output of the model to generate recommended settings to be applied (or changes to settings) (see 526 in FIG. 5B). At block 674, the administrator device may use the recommended settings to generate and transmit a command for the gateway to update the settings (528 in FIG. 5B), and the gateway may proceed to change the settings in block 676 (530 in FIG. 5B). Processing may then return to block 658, where the system determines if the conditions have evolved so as to warrant an alert or notification before awaiting the next command.

It is noted that blocks 658-664 may be performed in parallel, so that the system can continually evaluate whether an alert or notification is warranted while processing incoming requests for visualizations and settings updates.

Figure 7:
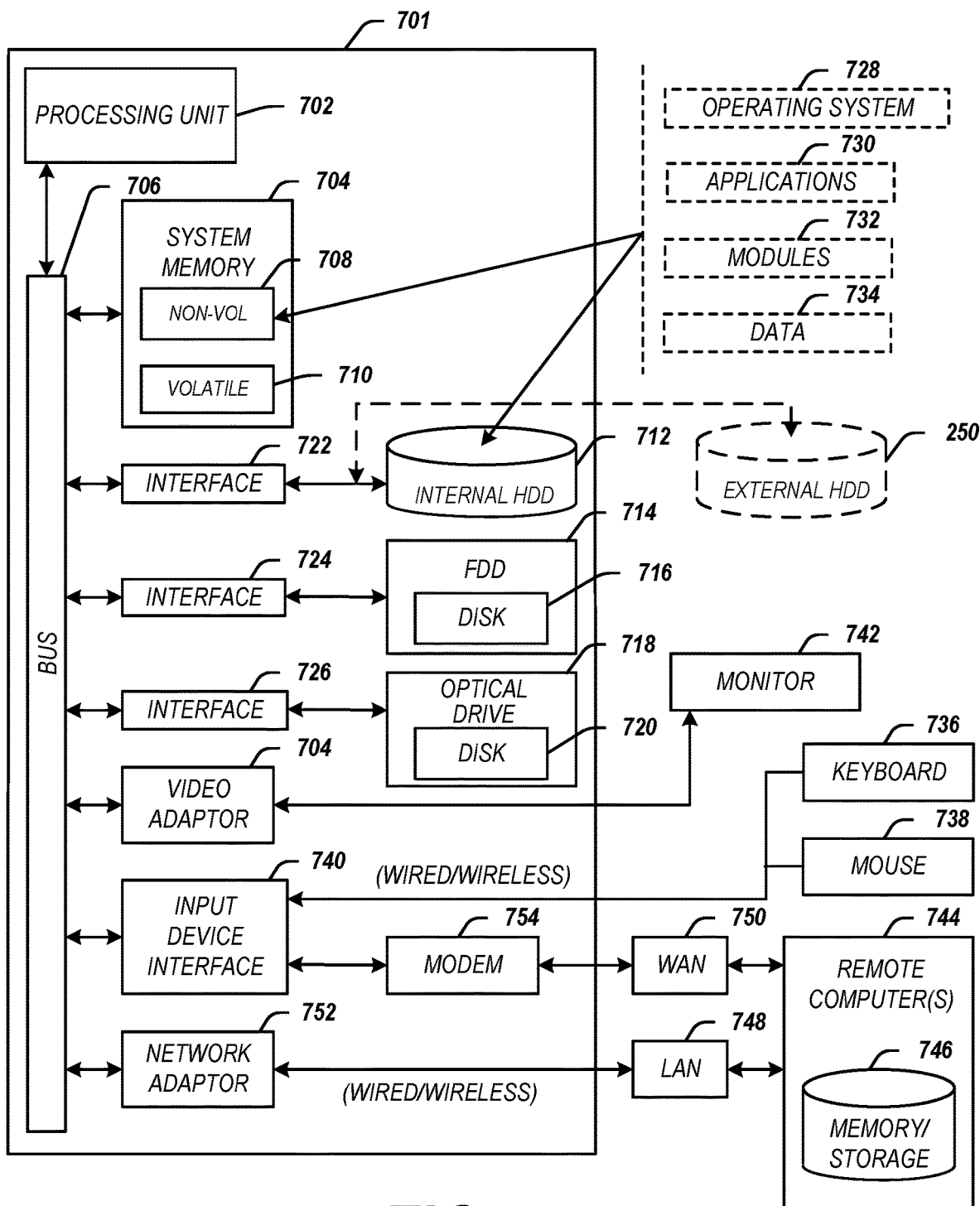
FIG. 7 depicts an exemplary computing system suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
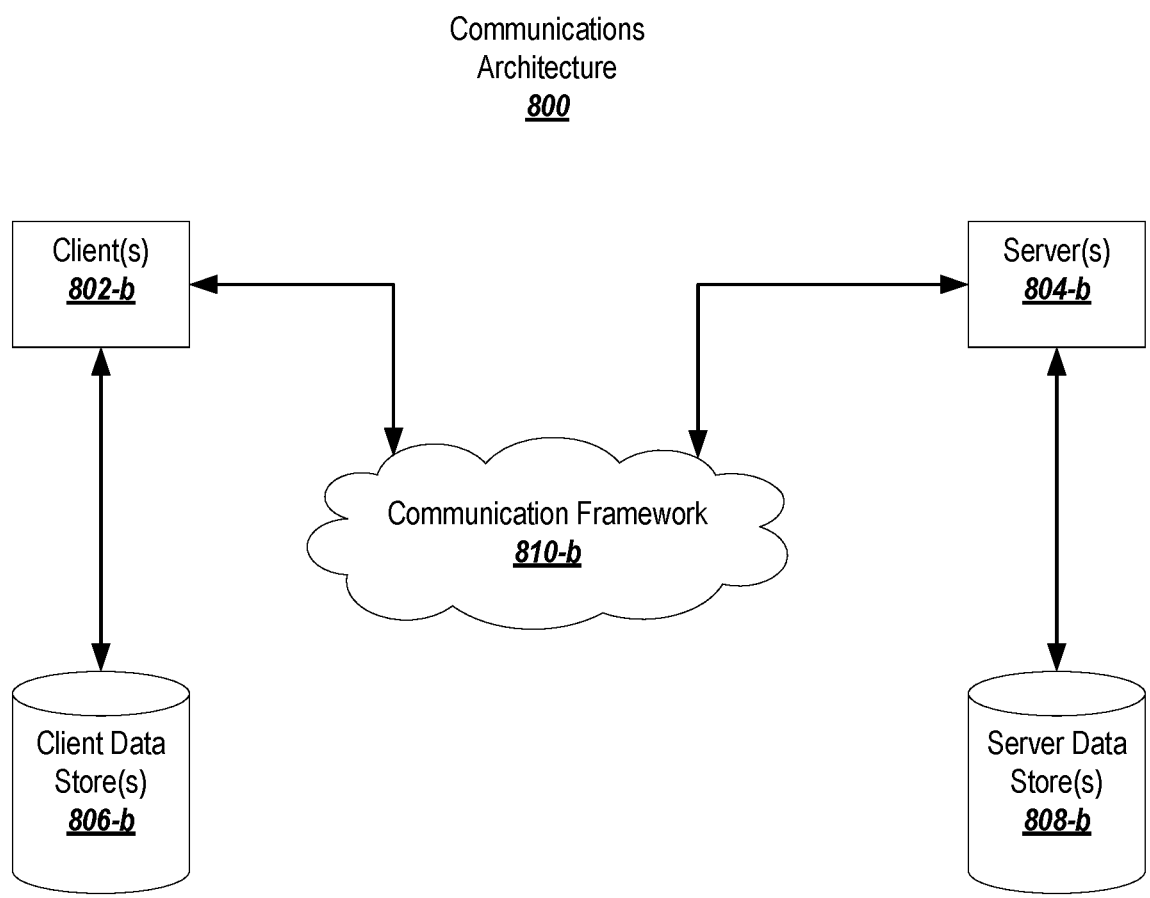
FIG. 8 depicts an exemplary network environment suitable for use with exemplary embodiments.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method comprising:
   automatically discovering one or more relational databases stored on one or more remote servers accessible through a network connection, wherein the automatically discovering is performed by auto-discovery code;
   receiving an application programming interface (API) call at a gateway, the gateway interfacing with a time series collector to collect time series performance metrics relating to the one or more relational databases;
   extracting, from the one or more relational databases via the network connection, performance data relating to a performance of the one or more relational databases, wherein extracting the performance data is performed by auto-scaling triggered code configured not to incur a charge when the auto-scaling triggered code is not running;
   converting the performance data into performance metrics, the performance metrics represented as time series data configured to be stored in a time series database accessible to the time series collector; and
   responding to the API call with the performance metrics.

2. The method of claim 1, further comprising:
   adding a new relational database to the one or more remote servers; and
   automatically discovering the new relational database without receiving further input from a user.

3. The method of claim 1, wherein the performance metrics relate to one or more of: a number or rate of queries to the relational databases, a number of connections to the relational databases, a size of the relational databases, a latency of queries to the relational databases, a replication status of the relational databases, an input/output status of the relational databases, or a status of a sequential scan of the relational databases.

4. The method of claim 1, further comprising retrieving data metrics relating to data stored in the relational databases, and adding the data metrics to the time series database.

5. The method of claim 1, further comprising:
  detecting that a selected performance metric has exceeded a predetermined threshold; and
  generating a notification to a database administrator identifying the selected performance metric.

6. The method of claim 1, further comprising:
  performing a machine learning process on the performance metrics; and
  using a result of the machine learning process to change a setting of the relational databases to improve one or more of the performance metrics.

7. The method of claim 1, wherein the automatically discovering comprises executing one or more scripts and submitting a query to the one or more remote servers.

8. The method of claim 1, wherein the automatically discovering comprises generating an auto-discovery request, the transmitting the auto-discovery request to the one or more remote servers, and receiving a response.

9. A non-transitory computer-readable medium storing instructions configured to cause one or more processors to:
  programmatically identify one or more relational databases stored on a cloud storage service;
  receive a method invocation at a gateway, the gateway interfacing with an aggregator to collect temporally-indexed statistics relating to the one or more relational databases;
  retrieve, from the cloud storage service, information pertaining to an operation of the one or more relational databases, wherein the retrieving of the information is performed by auto-scaling triggered code configured not to incur a charge with the cloud storage service when the code is not running;
  convert the information into the statistics, the statistics configured to be stored in a temporally-indexed database accessible to the aggregator; and
  respond to the method invocation with the statistics.

10. The medium of claim 9, wherein the statistics relate to one or more of: a number or rate of queries to the relational databases, a number of connections to the relational databases, a size of the relational databases, a latency of queries to the relational databases, a replication status of the relational databases, an input/output status of the relational databases, or a status of a sequential scan of the relational databases.

11. The medium of claim 9, further storing instructions for retrieving data statistics relating to data stored in the relational databases, and adding the data statistics to the temporally-indexed database.

12. The medium of claim 9, further storing instructions for:
  generating a visualization of the statistics; and
  outputting the visualization to a user of the cloud storage service.

13. The medium of claim 9, further storing instructions for:
  applying an artificial intelligence to the statistics; and
  recommending, with the artificial intelligence, a change to the cloud computing service to modify an operation of the cloud storage service with respect to the one or more relational databases.

14. The medium of claim 9, further storing instructions configured to adding a new relational database to the cloud storage service.

15. The medium of claim 14, further storing instructions configured to programmatically identify the new relational database after it is added to the cloud storage service.

16. An apparatus comprising:
  a network interface configured to submit a query at a third-party computing service, the third-party computing service configured to operate one or more relational databases on behalf of another entity;
  a memory storing respective identifiers of the one or more relational databases; and
  a processor circuit configured execute instructions, wherein the third-party computing service is Amazon Web Service (AWS), and the instructions are embodied as an AWS Lambda that is configured to not incur a charge with the third-party computing service when the instructions are not executing, the instructions configured to cause the processor circuit to:
    generate the query of the one or more relational databases based on the identifiers;
    process a request from a gateway, the gateway interfacing with a collector to collect chronologically-ordered parameters relating to the one or more relational databases;
    retrieve, from the third-party computing service, a response to the query;
    use the response to the query to compute the parameters, the parameters configured to be stored in a chronologically-ordered database accessible to the collector; and
    submit the parameters to the collector.

17. The apparatus of claim 16, wherein the processor circuit is further configured to automatically register a new relational database incorporated into the third-party computing service.

18. The apparatus of claim 16, wherein the parameters relate to one or more of: a number or rate of queries to the relational databases, a number of connections to the relational databases, a size of the relational databases, a latency of queries to the relational databases, a replication status of the relational databases, an input/output status of the relational databases, or a status of a sequential scan of the relational databases.

19. The apparatus of claim 16, wherein the processor is further configured to access data parameters relating to entries in the relational databases, and to add the data parameters to the chronologically-ordered database.

20. The apparatus of claim 16, wherein the processor is further configured to:
  applying a model to the parameters; and
  use the model to alter the third-party computing service or the relational databases to improve execution of database queries.

* * * * *